United States Patent Office 3,840,500
Patented Oct. 8, 1974

3,840,500
PROCESS FOR THE PREPARATION OF HIGH
MOLECULAR WEIGHT POLYAMIDES
Kaspar Ryffel, Ems, and Hans-Peter Lys, Winterthur, Switzerland, assignors to Inventa AG, Zurich, Switzerland
No Drawing. Continuation-in-part of abandoned application Ser. No. 61,414, Aug. 5, 1970. This application June 29, 1972, Ser. No. 267,460
Int. Cl. C08g 20/20
U.S. Cl. 260—78 R                              6 Claims

ABSTRACT OF THE DISCLOSURE

The preparation of high molecular weight polyamides in solid form by continuous drying-after-condensation independent of dwell-time. The process includes preparing low viscosity spinnable polyamides in the presence of organic acid as a chain stabilizer and mineral acid as a polymerization catalyst.

BACKGROUND OF THE INVENTION

This application is a continuation-in-part application of our copending application, Ser. No. 61,414, filed on Aug. 5, 1970, now abandoned.

The present invention relates to a two-step process for the preparation of stabilized high molecular weight polyamides in solid form, particularly in granular form. More particularly, a first stage is employed to prepare low-viscosity, spinnable linear polyamides in the presence of metered polymerization catalysts and chain stabilizers. In the second stage, the prepolymer is further polymerized to a desired homogeneous and dwell-time-independent higher final viscosity by simultaneous drying and after-condensing.

It is known that the molecular weight of uniform polyamides in a solid state, e.g. granules, can be increased as a result of after-condensation by tempering in an inert gas atmosphere or in a vacuum at temperatures of 30–80° C. below their melting point (Kunststoff-Handbuch, vol. 6, Polyamides, p. 235). However, it is also known that the resultant molecular weight or the relative viscosity of the product is a function of the dwell time of the granular material in the reaction column. Although the specific after-condensation time can be shortened by adding very small amounts of condensation catalysts, such as mineral acids, acid salts and esters (Swiss Patent Specification No. 359,286/1961, equivalent to U.S. 2,993,879 to Gabler et al., July 25, 1961). The curve of the relative viscosity of the granular material when plotted against the dwell time in the reaction chamber shows a steady rise which only becomes flatter after a rather long duration of reaction. Thus, prior to this invention, it was very difficult to economically obtain polyamides with a precisely defined final viscosity using conventional after-condensation processes.

For instance, in existing polymerization processes, to obtain definite rather high relative viscosities, e.g., $\eta_{rel.}$ of 3.5, high dwell times of 40 hours or more in a continuous polymerization apparatus are required. Another disadvantage of the conventional technique is the need to divide the polymerization reactor into various increased temperature stages. A special difficulty manifests itself upon the subsequent drying of the prepared and washed granular material, this drying having to be effected with great circumspection and being best performed batchwise in order not to change the viscosity obtained during the polymerization through after-condensation or keep this viscosity within as narrow limits as possible.

In conventional after-condensation methods, the use of a continuous procedure is completely unsuitable, because of the dependence of the final viscosity on the dwell-time. The particularly pronounced and more or less wide dwell-time spectrum cause differences in the viscosity of the individual granules and may also manifest themselves within the same granule by a viscosity gradient falling from the periphery to the center. The latter phenomenon cannot be excluded completely even in the discontinuous after-condensation process, which has alone been suitable heretofore for obtaining a product which is uniform to some extent.

In order to achieve an increase in the molecular weight of the product after polymerization, attempts have been made, for example, to heat granulated polyamides based on cyclic amides in a stream of inert gas in order to remove portions of low molecular weight therefrom. With a treatment of this kind, however, no significant increase in molecular weight occurs if the starting material used does not contain any suitable catalysts. On the other hand, when a cyclic amide, e.g., caprolactam is polymerized by conventional methods with $3.8 \times 10^{-4}$ mol of phosphoric acid, it shows a steady increase in molecular weight during after-polymerization.

GENERAL DESCRIPTION OF THE INVENTION

It has now unexpectedly been found on the basis of systematic tests that the degree of after-condensation can be predetermined and controllably limited by using low relative viscosity ($\eta_{rel.}$) prepolymers, where $\eta_{rel.}$ is less than about 2.5, having a water content defined in the art to yield a prepolymer which is just spinnable. A suitable amount of polymerization catalyst and stabilizer is also incorporated in the prepolymer. By this two-step procedure, a uniform, stabilized polyamide product is obtained where the length of dwell time required for after-condensation is about 20–50% or less of the time usually required in conventional processes.

Thus, by suitable choice of the conditions, by virtue of this effect according to the invention, the after-condensation can be stopped within a shortened time. In other words, the normally ascending after-condensation curve bends over into the asymptote parallel to the time coordinate and the viscosity of the product becomes independent of any further dwell time in the reaction chamber. This important effect permits the use of continuous reaction chambers for the preparation of uniform polyamides by after-condensation. The dwell time is, therefore, not critical and lasts only as long as is necessary to produce a final viscosity which does not vary to any desirable degree with further tempering. Specifically, the time may be as low as about 4 hours, but may range up to about 30 hours, after which no further benefits are achieved. One of the technical advantages of the present process is the achievement of a continuous production of a dwell-time-independent maximal homogeneous high-molecular polyamide in a relatively short time and without the difficult working up of a molten high viscose and non-homogeneous polyamide as in the prior art. Moreover, steps of drying the prepolymer prior to final polymerization can be carried out simultaneously when the teachings of this invention are practiced, as will become more apparent hereinafter.

Broadly stated, the process according to the present invention is carried out in two stages. First, polymerization of the monomer is effected in a continuous heater at a rate proportional to the amount of water present. The degree of polymerization is restricted to yield a prepolymer having a relatively low relative viscosity or molecular weight. Relative viscosities of up to about 2.5 have been found to be desirable, with the preferred range being from about 2.0 to about 2.5.

The amount of water present in the first stage is important in obtaining the required low relative viscosity prepolymer. The water content which should be no more than about 0.5% and preferably between 0.05 and 0.5% by weight of the polymer is believed to be the controlling chain length stabilizer in the first stage. Where the 0.5% upper limit for water is exceeded, the prepolymer is generally brittle and not spinnable. The term "spinnable" or "just spinnable" as is used in this specification is related to the water content. Thus, a "just spinnable" prepolymer has a water content within the range of 0.05 to 0.5%. Suitable amounts of catalyst and stabilizer can be added to the water, such that the second-stage after-condensation can be carried out continuously in a combined drying and after-condensation column to obtain a much higher relative viscosity polyamide.

The first-stage prepolymer polyamide granules can be washed whereupon the water content is increased to about 6% by weight. The water is thereafter expelled at temperatures generally ranging from about 10–100° C. below the melting point of the polyamide by hot nitrogen which is introduced into the column. Within the broad range of 10°–100° C. below the melting point of the polyamide, the amide chains lengthen and, in accordance with the amount of acid stabilizer added, there is formed a stabilized product of higher molecular weight in which the chain ends are only saturated with acids. Advantageously, the combined drying-after-condensation temperatures employed are 10–70° C. below the melting point in the case of polyamide 6 and polyamide 6,6, and 10–30° C. below the melting point in the case of polyamide 12. The preferred range of relative viscosity of the finally-formed polyamide ranges from about 2.7 to about 5.8.

The polyamides which can be processed according to the two-step process of the present invention are linear polycarbonamides and polylactams having 6–12 carbon ring atoms. For purposes of brevity, the generic term "polyamide" is used to describe the polymer processed. Thus, polyamides 6–12, 6, 11, 12, 6,6, 6,10 and other polycondensate combinations are contemplated. For purposes of completeness, it should be mentioned that polyamide 6,6 is generally made by polymerizing adipic acid and hexamethylenediamine; polyamide 6,10 is a condensation product of hexamethylenediamine and sebacic acid; polyamide 6 is polymerized $\epsilon$-caprolactam; polyamide 11 is produced from 11-aminoundecanoic acid derived from castor oil; polyamide 12 is polymerized from lauryllactam. Copolymers of polyamides 6, 6,6 and 6,10 and the like are also contemplated.

As polymerization catalysts, there may be used mineral or inorganic acids, especially phosphoric, hydrochloric and sulfuric acids. In addition, the following acids, acid salts, acid esters, etc., are contemplated: hydrobromic acid, hydriodic acid, chloric acid, perchloric acid, nitric acid, polyphosphoric acids and acid salts of the aforesaid acids, for example, potassium bisulphate, primary and secondary sodium phosphate and so forth. Halogen derivatives and the esters of the mineral acids are also suitable, for example chlorosulphonic acid, ethylene sulphuric acid, dimethylsulphate, mono - isopropyl - phosphate, triethyl phosphate and so forth. The amount of these acid substances which is necessary depends upon the speed of the condensation which is desired. Broadly, the catalysts develop their greatest effectiveness between $10^{-6}$ and $10^{-3}$ mol acid per mol of monomeric polyamide-forming substance can be used. If considerably higher additions are made, the effect is partly or entirely lost owing to the stabilizing effect which occurs.

As chain stabilizers, organic mono- and dicarboxylic acids are preferred. These include the fatty acids, $C_nH_{2n+1}COOH$, where $n=1-20$, e.g., formic, acetic, propionic, etc.; oxalic acid series, $C_nH_{2n}(COOH)_2$, wherein $n=0-15$, e.g., oxalic, malonic, succinic, glutaric, adipic, pimelic, suberic, azelaic, sebacic, etc.; fumaric acid series, $C_nH_{2n-2}(COOH)_2$, wherein $n=2-17$, e.g., fumaric, maleic, etc.; aromatic acids including benzoic, terephthalic, etc. Also useful are the sebacic and stearic acids. Broadly, the amount of the organic acids which can be used as a stabilizer ranges from $6 \times 10^{-3}$ to $0.1 \times 10^{-3}$ mol per mol of the monomer unit.

The relative final viscosity of the polyamide product will depend on the concentration of the stabilizer. For example, to obtain relative final viscosities of 3–5.8 for polycaprolactam, from $3.9 \cdot 10^{-3}$–$0.8 \cdot 10^{-3}$ mol of acetic acid are required per mol of monomer unit; similarly, the amount of phosphoric acid required is about $10^{-4}$ mol per mol of monomer unit. On the other hand, to obtain relative final viscosities of 2.7–4, from $3.94 \cdot 10^{-3}$–$2 \cdot 10^{-3}$ mol of adipic acid are needed per mol of monomer unit.

The advantages of the two-step method according to the present invention described in relation to the state of the art, are as follows:

(1) The present process can be performed continuously because the final viscosity is adjustable and independent of dwell time and the viscosity of the product can be checked by means of time samples. The resulting polyamide granules are of homogeneous viscosity, this viscosity being also uniform within the individual granules.

(2) Due to the specific conditions employed during pre-polymerization, it is possible to dry the washed granular material at a high temperature simultaneously with after-condensation, thereby eliminating the undesirable, non-uniform after-condensation products heretofore obtained.

(3) The volumetric yield per unit of time is substantially higher, because the throughput in the polymerization tube in the present method is independent of the desired final viscosity; this throughput can proceed in a constant manner and more quickly, since the aim is prepolymers with a water content which is at an optimum level and practically speaking always equal. Moreover, the production of high viscosities in the after-condensation reaction vessel proceeds more rapidly than in the polymerizer.

Having thus described the invention in its broadest aspects, reference is now made to specific examples which describe in greater detail preferred embodiments. However, it will be understood that these examples are not to be construed as being limitive of the invention.

EXAMPLE 1

$\epsilon$-Caprolactam monomer is polymerized in a continuous heater, with a water content of about 0.2% by weight of the prepolymer, such that a viscosity of the resulting polyamide of about 2.0 is obtained which just enables a spinnable product to be obtained. $3.8 \times 10^{-4}$ mol of phosphoric acid and $2.5 \times 10^{-3}$ mol of acetic acid were added per mol of monomer unit. The prepolymer formed is drawn off as filament and is cut up after cooling in a water bath. The granular material formed is washed in a counter-current washer until free from extract and is brought batchwise to a final viscosity of $\eta_{rel.}=3.7$ in a drying and after-condensation reaction vessel by means of nitrogen at a temperature of 180° C. and with a dwell time of 8 hours. A further treatment for 20 hours produces no further change in the relative viscosity of the homogeneous polyamide 6 product.

EXAMPLE 2

With a smaller metered addition of stabilizer consisting of $0.8 \cdot 10^{-3}$ mol of acetic acid referred to 1 mol of monomer unit and under the same other conditions of Example 1, but with the use of a continuously operated drying and after-condensation column and checking of the constant viscosity by taking samples during the concluding phase, the uniform final viscosity of polyamide 6 is increased to $\eta_{rel.}=5.8$ after a period of action of 20 hours.

EXAMPLE 3

Hexamethylene adipamide is used instead of ε-caprolactam in the same way and with the same proportions and with practically the same final viscosity.

EXAMPLE 4

The same procedure followed in Example 1 is used except adipic acid, as stabilizer, is employed in an amount of $2 \times 10^{-3}$ mol, and the phosphoric acid content is $4.5 \cdot 10^{-4}$ mol per mol of monomer unit. The resulting polyamide 6 had a constant homogeneous final viscosity of $\eta_{rel.} = 4$. A drying-after-condensation temperature of 180° C. was used with a dwell time of 12 hours.

From the foregoing examples, it should be appreciated that the present invention offers significant improvements over prior techniques. The shortened, combined drying-after-condensation time of 8–18 hours observed in the foregoing examples are roughly 20–50% less than the prior art dwell times for separately performing drying and after-condensation of polyamide prepolymers.

It should also be noted that the viscosity values appearing throughout this specification, except where noted otherwise in Example 6 were obtained by measuring in a solution of 1 g. polyamide per 100 ml. $H_2SO_4$ (conc.) at 20° C. A conventional Ubbelohde-viscosimeter was employed.

It should be appreciated that the present invention is not to be construed as being limited by the illustrative embodiments. It is possible to produce still other embodiments without departing from the inventive concepts herein disclosed. Such embodiments are within the ability of one skilled in the art.

It is claimed:

1. A two-stage continuous process for preparing dwell-time stabilized, high molecular weight linear polyamide granules comprising the steps:
   (a) forming a saturated aliphatic polycarbonamide prepolymer in a first stage by reacting its corresponding monomer in the presence of a controlled amount of initially added water, ranging from about 0.05% to about 0.5% by weight of the prepolymer, with $10^{-3}$ to $10^{-6}$ mol of inorganic mineral acid catalyst per mol of monomer and $6 \times 10^{-3}$ to $0.1 \times 10^{-3}$ mol of chain stabilizer per mol of monomer, said chain stabilizer taken from the group of aliphatic or aryl acids consisting of mono- and di-carboxylic organic acids, said prepolymer being characterized by being just spinnable, non-brittle and having a low relative viscosity value of from about 2 to about 2.5, each of said granules being substantially uniform with respect to said low viscosity;
   (b) said second stage comprises simultaneously drying the polycarbonamide prepolymer formed in said first state at from about 30° C. to about 80° C. below the melting point of the polycarbonamide prepolymer and further polymerizing said prepolymer to expel water and to permit chain lengthening to continue until said prepolymer reaches a relative viscosity value in the range of from about 2.7 to about 5.8, said resulting higher molecular weight polycarbonamide having a substantially uniform relative viscosity within each granule and from granule to granule, and independent dwell-time properties resulting in stabilization the viscosity being determined by 1 g. polyamide per 100 ml. of concentrated sulphuric acid at 20° C.

2. The two-stage process of claim 1 wherein said polycarbonamide comprises polyhexamethylene adipamide.

3. The two-stage process of claim 1 wherein said polycarbonamide comprises poly-epsilon-caprolactam.

4. The two-stage process of claim 1 wherein said inorganic acid is selected from the group consisting of phosphoric acid, hydrochloric acid and sulfuric acid, said aliphatic acid is selected from monocarboxylic acids of the formula: $C_nH_{2n+1}COOH$ wherein $n = 1-20$; dicarboxylic acids of the formula: $C_nH_{2n}(COOH)_2$ wherein $n = 0-15$, and of the formula $C_nH_{2n-2}(COOH)_2$ wherein $n = 2-17$, said aryl acids are taken from the group selected from benzoic acid, terephthalic acid.

5. The two-stage process of claim 4 wherein said dicarboxylic acid is adipic acid.

6. Product consisting essentially of the polymeric condensation polymer formed according to the process defined in claim 1, characterized as having uniform relative viscosity properties from granule to granule and throughout each of said granules.

References Cited
UNITED STATES PATENTS

| | | | |
|---|---|---|---|
| 2,993,879 | 7/1961 | Grabler et al. | 260—78 SC |
| 3,321,447 | 5/1967 | Kunde et al. | 260—78 SC |
| 3,476,711 | 11/1969 | Muller et al. | 260—78 SC |
| 3,109,835 | 11/1963 | Apostle et al. | 260—78 SC |
| 3,359,245 | 12/1967 | Meyer | 260—78 SC |
| 3,378,532 | 4/1968 | Fritz et al. | 260—78 SC |
| 3,420,804 | 1/1969 | Ramsey et al. | 260—78 SC |
| 3,509,107 | 4/1970 | Brignac | 260—78 SC |
| 3,558,569 | 1/1971 | Goto et al. | 260—78 SC |
| 3,562,206 | 2/1971 | Silverman et al. | 260—78 SC |

HAROLD D. ANDERSON, Primary Examiner

U.S. Cl. X.R.

260—18 N, 78 A, 78 L